(12) United States Patent
Sundaram et al.

(10) Patent No.: US 6,560,502 B1
(45) Date of Patent: May 6, 2003

(54) SYSTEM AND METHOD FOR CAMPAIGN PLANNING

(75) Inventors: Vaidya N. Sundaram, Irving, TX (US); Kalyanaraman Vaidyanathan, Arlington, MA (US)

(73) Assignee: i2 Technologies US, Inc., Dallas, TX (US)

(*) Notice: Subject to any disclaimer, the term of this patent is extended or adjusted under 35 U.S.C. 154(b) by 56 days.

(21) Appl. No.: 09/895,528

(22) Filed: Jun. 28, 2001

(51) Int. Cl.[7] .............................................. G05B 19/42
(52) U.S. Cl. ....................................... 700/100; 700/148
(58) Field of Search ................................. 700/223, 100, 700/148; 709/104, 102; 705/28, 29

(56) References Cited

U.S. PATENT DOCUMENTS

| 4,658,363 A | * | 4/1987 | Tippins et al. ............... 700/148 |
| 5,808,891 A | * | 9/1998 | Lee et al. .................... 700/100 |
| 6,044,361 A |   | 3/2000 | Kalagnanam et al. ......... 705/28 |
| 6,321,132 B1 | * | 11/2001 | Dawande et al. ............. 700/97 |

* cited by examiner

Primary Examiner—Leo Picard
Assistant Examiner—Alexander Kesowski
(74) Attorney, Agent, or Firm—Baker Botts L.L.P.

(57) ABSTRACT

A system (100) for campaign planning includes a memory (106) operable to store at least two slab values (132) for each of a plurality of slabs (108). The slab values (132) for a slab are associated with at least two properties of the slab (108). The memory (106) is also operable to store at least one preference value (142) identifying a relative importance between the properties of the slabs (108). The system (100) also includes one or more processors (128) collectively operable to generate a sort value (400) for each of the slabs (108). The sort value (400) depends at least partially on the slab value (132) associated with the slab (108) and the preference value (142). The processor (128) is also operable to allocate the slabs (108) to a plurality of rounds (200) in a campaign (250). The slabs (108) are allocated in an order depending at least partially on the sort values (400) associated with the slabs (108).

48 Claims, 8 Drawing Sheets

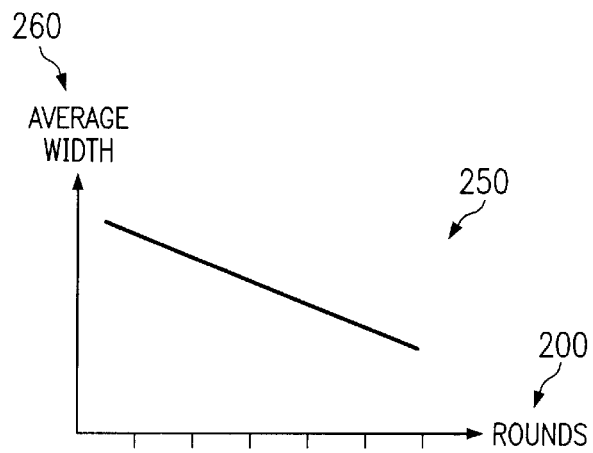
FIG. 3C
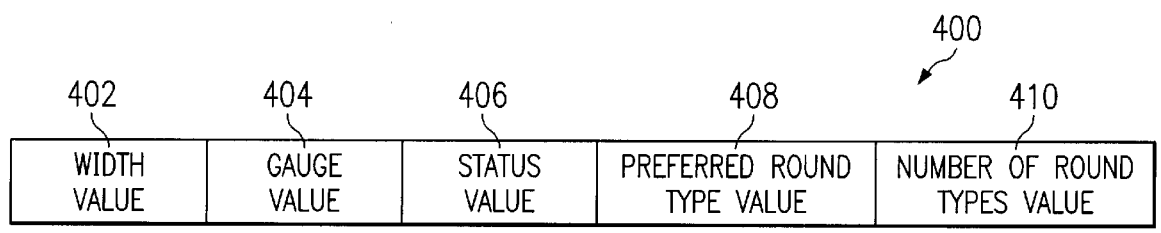
FIG. 4
| WIDTH INDEX | WIDTH VALUE |
|---|---|
| 62 ≤ w < 66 | 1 |
| 58 ≤ w < 62 | 2 |
| 54 ≤ w < 58 | 3 |
| 50 ≤ w < 54 | 4 |
| 46 ≤ w < 50 | 5 |
| 42 ≤ w < 46 | 6 |
| 38 ≤ w < 42 | 7 |
| 34 ≤ w < 38 | 8 |
FIG. 5

| GAUGE INDEX | GAUGE VALUE |
|---|---|
| $0.50 \leq g < 0.60$ | 1 |
| $0.45 \leq g < 0.50$ | 2 |
| $0.40 \leq g < 0.45$ | 3 |
| $0.30 \leq g < 0.40$ | 4 |

FIG. 6

| STATUS INDEX | STATUS VALUE |
|---|---|
| LATE | 1 |
| CURRENT | 2 |
| FUTURE | 3 |

FIG. 7

| PREFERRED ROUND INDEX | PREFERRED ROUND TYPE VALUE |
|---|---|
| A | 1 |
| B | 2 |
| C | 3 |
| NO PREFERENCE | 4 |

FIG. 8

| NUMBER OF ROUND TYPES INDEX | NUMBER OF ROUND TYPES VALUE |
|---|---|
| 1 | 1 |
| 2 | 2 |
| 3 | 3 |
| 4 | 4 |

FIG. 9

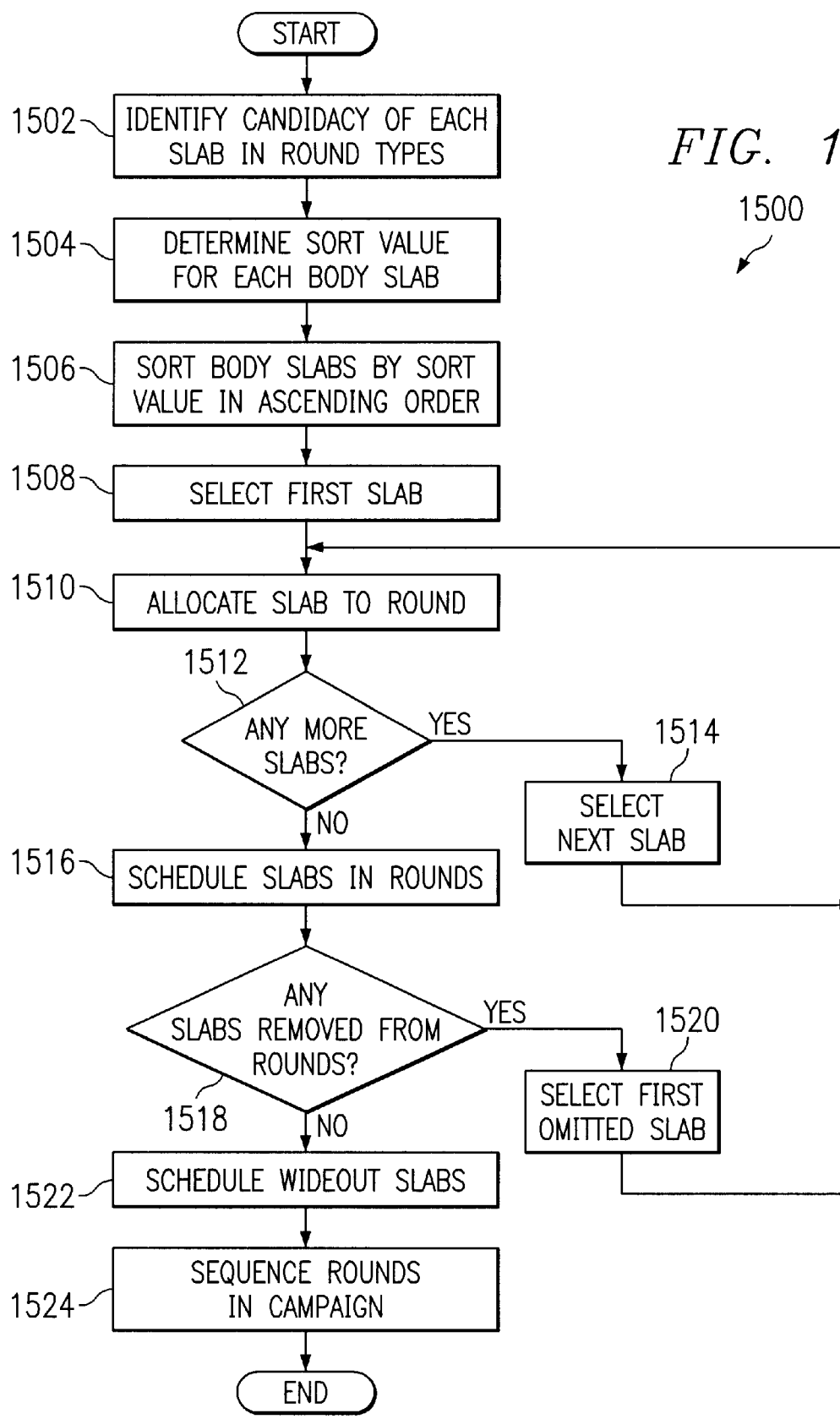

SYSTEM AND METHOD FOR CAMPAIGN PLANNING

TECHNICAL FIELD OF THE INVENTION

This invention relates generally to the field of planning, and more particularly to a system and method for campaign planning.

BACKGROUND OF THE INVENTION

In the metals industry, such as the steel industry, a mill typically processes slabs of metal. The slabs processed by the mill may have different physical and/or chemical attributes. For example, each slab typically has physical properties such as a length, a width, and a gauge. Each slab also typically has chemical properties such as chemical composition and a rate at which the slab is cooled after processing. During processing, the gauge of a slab typically decreases, while the length of the slab typically increases. This forms the slabs into shapes needed by the customers of the mill. In the mill, groups of slabs are typically processed sequentially in a batch, and a sequence or group of slabs may be referred to as a "round." The mill typically specifies the rules for determining which slabs may be processed in a round based on the chemical properties of the slabs and other process-related and equipment-related characteristics. A series of rounds may be referred to as a "campaign."

The order of the slabs processed in a round and the order of the rounds in a campaign typically depend, at least in part, on the characteristics of the equipment processing the slabs. For example, large changes in the widths of two consecutive slabs may damage the equipment in the mill. When this occurs, the mill loses money because the equipment needs to be replaced, and the mill cannot process the slabs while the equipment is being replaced. It may be difficult to efficiently determine which slabs to process in a round and to order the rounds in a campaign.

SUMMARY OF THE INVENTION

According to the present invention, problems and disadvantages associated with scheduling slabs in a campaign have been substantially reduced or eliminated.

In one aspect of the invention, a system for campaign planning includes a memory operable to store at least two slab values for each of a plurality of slabs. The slab values for a slab are associated with at least two properties of the slab. The memory is also operable to store at least one preference value identifying a relative importance between the properties of the slabs. The system also includes one or more processors collectively operable to generate a sort value for each of the slabs. The sort value depends at least partially on the slab value associated with the slab and the preference value. The processor is also operable to allocate the slabs to a plurality of rounds in a campaign. The slabs are allocated in an order depending at least partially on the sort values associated with the slabs.

Certain technical advantages may be provided according to various embodiments of the present invention. Particular embodiments of the invention may exhibit none, some, or all of the following advantages. For example, in one embodiment, a system for campaign-level planning in a facility is provided. The system may receive information about slabs to be processed by the facility, and the system may allocate the slabs to different rounds during a campaign. The system may also schedule the order in which the slabs will be processed during the rounds. By allocating and scheduling the slabs, the system may reduce or eliminate the need to manually schedule the slabs, which reduces the amount of time needed to produce a schedule for a campaign.

The system may also produce more efficient schedules for a campaign. For example, the system may create a campaign during which the facility may process more slabs. Efficient schedules may also help to reduce inventory levels. The increase in the number of slabs processed may help the facility to supply slabs to customers in a more efficient manner. The more efficient schedule may also help to increase the useful life of the equipment used in the facility to process the slabs. The increase in the number of slabs processed, the reduction of inventory levels, and the increase in the useful life of the equipment may also help the facility to save money, often in significant amounts.

In addition, the system may take into account user preferences in scheduling the slabs during the campaign. For example, in a particular embodiment, the user may rank which attributes or properties of the slabs are more important in determining a schedule for the slabs. The user may indicate that the status of the slabs (whether the slab is on time or late) is the most important factor in scheduling the slabs. This allows the system to take into account the user's preferences in scheduling the slabs. This also allows the system to order the slabs in different ways for different customers, depending on the priorities of those customers. Further, this may provide the user with adequate flexibility and control, allowing the user to customize the system for use with a particular business.

Other technical advantages may be readily apparent to those skilled in the art from the figures, descriptions, and claims included herein.

BRIEF DESCRIPTION OF THE DRAWINGS

To provide a more complete understanding of the present invention and features and advantages thereof, reference is made to the following description taken in conjunction with the accompanying drawings, in which:

FIGS. 3A through 3C illustrate example variations in the width of slabs processed during a campaign;

FIG. 4 illustrates an example sort value used to control the order in which slabs are allocated to rounds in a campaign;

FIG. 5 illustrates an example width table used to generate a sort value;

FIG. 6 illustrates an example gauge table used to generate a sort value;

FIG. 7 illustrates an example status table used to generate a sort value;

FIG. 8 illustrates an example preferred round type table used to generate a sort value;

FIG. 9 illustrates an example number of round types table used to generate a sort value;

FIG. 15 illustrates yet another example method for campaign planning.

DETAILED DESCRIPTION OF EXAMPLE EMBODIMENTS

Figure 1:
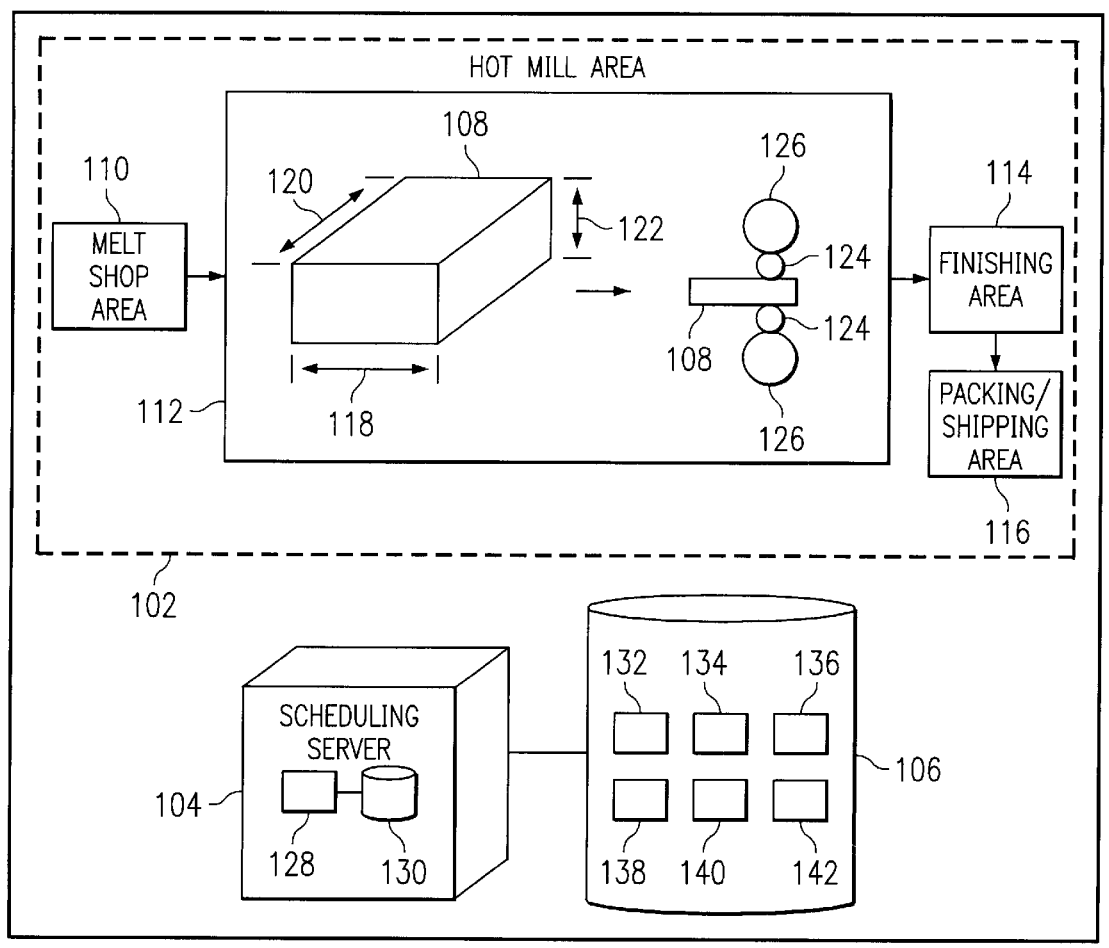
FIG. 1 illustrates an example system for campaign planning.

FIG. 1 illustrates an example system 100 for campaign planning. In the illustrated embodiment, system 100 includes one or more facilities 102, a scheduling server 104, and a database 106. Other embodiments of system 100 may be used without departing from the scope of the present invention.

In one embodiment, facility 102 includes one or more areas that process slabs 108. A slab 108 represents a material or materials manufactured, formed, shaped, or otherwise processed by facility 102. Slab 108 could, for example, be formed of a metal, such as steel, and have any suitable size and/or shape. Server 104 schedules the order of slabs 108 processed by facility 102. In one embodiment, slabs 108 may be grouped into "rounds," and a series of rounds may be processed during a "campaign." Server 104 may group slabs 108 into rounds and schedule the order of the slabs 108 processed during each round. Server 104 may also order the rounds processed during a campaign. By allocating slabs 108 to various rounds, scheduling the order of slabs 108 processed in each round, and/or ordering the rounds, server 104 may efficiently create a schedule for an entire campaign. Server 104 may also save facility 102 money by increasing the number of slabs 108 processed in a given time period, by reducing inventory levels, and by increasing the useful life of equipment in facility 102. In addition, server 104 may allocate slabs 108 to rounds based on user preferences, which allows server 104 to customize a schedule based on the priorities of the user. This may allow, for example, the user to customize the system 100 for use with the user's business.

In the illustrated embodiment, facility 102 includes a melt shop area 110, a hot mill area 112, a finishing area 114, and a packing/shipping area 116. Other embodiments of facility 102 may be used without departing from the scope of the present invention. Melt shop area 110 represents an area of facility 102 where raw materials are melted and formed into slabs 108. In one embodiment, melt shop area 110 may form slabs 108 having different physical and/or chemical properties. For example, slabs 108 may be formed from different materials, giving slabs 108 different chemical properties. The types of slabs 108 formed by melt shop area 110 may depend, at least in part, on the orders received from customers of facility 102. For example, some customers may require slabs 108 produced from steel having specific chemical properties, while other customers may accept slabs 108 produced from two or more types of steel. Melt shop area 110 may include any structure or structures suitable for forming slabs 108.

Hot mill area 112 processes the slabs 108 produced by melt shop area 110. In one embodiment, each slab 108 has an associated length 118, width 120, and gauge 122. In a particular embodiment, hot mill area 112 processes slabs 108 by reducing the gauge 122 of slabs 108 while substantially maintaining the width 120 of slabs 108, which causes an increase in the length 118 of slabs 108. Hot mill area 112 may include any structure or structures suitable for processing slabs 108.

In the illustrated embodiment, hot mill area 112 includes working rolls 124 and backup rolls 126. Working rolls 124 come into contact with and reduce the gauge 122 of slabs 108. Backup rolls 126 provide additional support for working rolls 124 when working rolls 124 are in contact with slabs 108. In one embodiment, working rolls 124 may process particular types of slabs 108. For example, working rolls 124 may be able to process slabs 108 having a specific chemical composition and at particular temperatures. One set of working rolls 124 may be unable or less suitable to process slabs 108 having different chemical compositions or different temperatures. In this embodiment, slabs 108 that can be processed by the same working rolls 124 may be grouped together and processed during a round, and the working rolls 124 may be changed after each round. Also, in one embodiment, backup rolls 126 may be changed after each campaign. Other embodiments of hot mill area 112 may be used without departing from the scope of the present invention.

Finishing area 114 receives the processed slabs 108 from hot mill area 112. Finishing area 114 also finishes processing slabs 108 so that slabs 108 meet the orders received from customers of facility 102. This may include, for example, finishing area 114 processing slabs 108 so that slabs 108 have the appropriate surface quality, width, gauge, and/or coating requested by a customer. The processes used by finishing area 114 may vary depending on the type of slabs 108 being processed in a round. For example, the slabs 108 in different rounds may require different furnace temperatures and coating processes. Finishing area 114 may include any structure or structures suitable for producing finished slabs 108.

Packing/shipping area 116 receives finished slabs 108 from finishing area 114. Packing/shipping area 116 may also prepare the finished slabs 108 for shipment to customers. This may include, for example, packing/shipping area 116 loading the finished slabs 108 into containers and loading the containers onto trucks or trains. Packing/shipping area 116 may include any structure or structures suitable for sending finished slabs 108 to customers.

Server 104 processes information stored in database 106 and performs campaign planning operations on behalf of facility 102. In the illustrated embodiment, server 104 includes a processor 128 and a memory 130. Other embodiments of scheduling server 104 may be used without departing from the scope of the present invention.

Processor 128 is coupled to memory 130. In this document, the term "couple" refers to any direct or any indirect communication between two or more elements, whether or not those elements are in physical contact with one another. Processor 128 executes instructions and manipulates data to perform the campaign planning functions of server 104. Processor 128 may be any processor suitable to perform campaign planning functions. Although FIG. 1 illustrates a single processor 128 in server 104, multiple processors 128 may be used according to particular needs.

Memory 130 stores and facilitates retrieval of information used by processor 128 to perform the campaign planning functions of server 104. Memory 130 may, for example, store instructions to be performed by processor 128 and data used by processor 128. Memory 130 may include any hardware, software, firmware, or combination thereof suitable to store and facilitate retrieval of information. Although FIG. 1 illustrates memory 130 as residing within server 104, memory 130 may reside at any location or locations accessible by processor 128.

Database 106 is coupled to server 104. Database 106 stores and facilitates retrieval of information used by server 104 to perform campaign planning operations in system 100, such as information describing the characteristics of slabs 108. Database 106 may comprise any of a variety of data structures, arrangements, and/or compilations suitable to store and facilitate retrieval of information. Although FIG. 1 illustrates database 106 as residing within system 100, database 106 may reside in any suitable location or locations accessible by server 104. Database 106 may include any hardware, software, firmware, or combination thereof suitable to store and facilitate retrieval of information.

Database 106 may store and processor 128 may process any suitable information to perform campaign planning operations in system 100. The following examples are for illustration only. Any other and/or additional types of information may be used without departing from the scope of the present invention. Also, the information stored in database 106 may be received using any suitable method. For example, a user could provide some or all of the information to server 104 using a workstation or other computing device coupled directly to server 104, server 104 could automatically generate some or all of the information, or some or all of the information could be supplied to server 104 by autonomous enterprise systems associated with facility 102, customers of facility 102, or other suitable entity.

In one embodiment, database 106 stores slab information 132 identifying properties of slabs 108 to be processed during a campaign. For example, slab information 132 may identify the length 118, width 120, and gauge 122 of each slab 108 to be processed by hot mill area 112. Slab information 132 may also identify the finishing temperature at which slab 108 will be processed in hot mill area 112. Further, slab information 132 may identify the status of a slab 108, such as whether slab 108 is being processed for a late customer order. In addition, slab information 132 may identify the due date of a slab 108 and the material or materials that form slab 108. The information about slabs 108 may be referred to as an "order book." Other and/or additional types of slab information 132 may be used in system 100 without departing from the scope of the present invention.

Database 106 may also store round type information 134. In one embodiment, hot mill facility 112 processes a group of slabs 108 as a round, and different types of rounds may exist. Round type information 134 identifies the different types of rounds that may be used to process slabs 108 during a campaign. For example, round type information 134 may identify the names of the round types and the type of slabs 108 that can be processed during each round type. Round type information 134 may also include the furnace temperature to be used in a round type. Round type information 134 may further identify the maximum footage of slabs 108 that can be processed during a round type. For example, a round of one round type may be able to process up to ten thousand feet of slabs 108, while a round of another round type may be able to process up to five thousand feet of slabs 108. Other and/or additional round type information 134 may be used without departing from the scope of the present invention.

Database 106 may further store candidacy rules 136. Candidacy rules 136 identify the properties that a slab 108 should possess in order to become a candidate for a particular round type. A slab 108 is a "candidate" for a round type when the slab 108 could be processed by a round of that round type. For example, one of the round types identified by round type information 134 may only be able to process slabs 108 having a particular chemical composition. Slabs 108 lacking this chemical composition may not be processed during a round of this round type, so those slabs 108 are not candidates for that round type. Slabs 108 having the appropriate chemical composition may be processed during a round of that round type and are therefore candidates for that round type. In one embodiment, a slab 108 may be a candidate for one round type or for multiple round types. For example, a slab 108 may meet all of the candidacy rules 136 for two or more round types, and that slab 108 may be processed by any of these round types. Candidacy rules 136 may involve any suitable characteristic or property of slabs 108, such as the chemical composition, length 118, width 120, gauge 122, due date, and status of slabs 108. Other and/or additional candidacy rules 136 may be used without departing from the scope of the present invention.

In a particular embodiment, different types of candidacy rules 136 may be used. For example, "membership" candidacy rules 136 may be used to determine if the chemical composition of a slab 108 may be processed during a round type. "Filter" candidacy rules 136 may be used to determine if the length 118, width 120, and gauge 122 of slab 108 may be processed during a round type. Other filter candidacy rules 136 may be based on characteristics of a facility 102, such as whether the hot mill area 112 of the facility can reach a particular temperature. In this embodiment, the different types of candidacy rules 136 may applied in a particular order. For example, membership candidacy rules 136 may be applied first. If a slab 108 does not qualify for a round type based on the membership rules 136, the filter candidacy rules 136 need not be applied to the slab 108. If the slab 108 meets the membership candidacy rules 136, the filter candidacy rules 136 may be applied to the slab 108 to determine its candidacy in a round type.

Database 106 may also store slab sequence constraints 138. Slab sequence constraints 138 identify rules and constraints used to determine the order in which 10 slabs 108 are processed in a round. The following example constraints 138 are for illustration only. Other suitable constraints 138 may be used in system 100 without departing from the scope of the present invention. For example, in one embodiment, slab sequence constraints 138 may include a constraint to prevent groove formation in working rolls 124. This constraint 138 limits the number of slabs 108 having the same width 120 processed by hot mill area 112 in a round. As a particular example, hot mill area 112 may be able to process up to 2,000 feet of slabs 108 that have the same width 120 in a round. If more than this amount is processed by hot mill area 112, grooves may form in working rolls 124, requiring replacement of working rolls 124.

Slab sequence constraints 138 may also include one or more jump constraints. Jump constraints limit the changes in physical dimension between consecutively scheduled slabs 108 in a round. For example, working rolls 124 may only be able to process two consecutive slabs that have a change in width 120 of less than six inches. Another jump constraint may specify that the gauge 122 of two consecutive slabs may change only up to fifty percent. In addition, a jump constraint may specify that the finishing temperature of two consecutive slabs 108 may not differ by more than three hundred degrees Fahrenheit. Other jump constraints may be used without departing from the scope of the present invention.

Slab sequence constraints 138 may further include a maximum run constraint, which defines the maximum number of "short" slabs 108 that can be processed in consecutive order during a round. In one embodiment, a slab 108 may be labeled as a "short" slab 108 or a "long" slab 108, depending on the length 118 of slabs 108. In this document, the terms "short" and "long" refer to relative distances, and are not meant to correspond to any specific dimensions. In this embodiment, the maximum run constraint may state that up to two or three short slabs 108 may be processed consecutively before another type of slab 108 should be processed.

Slab sequence constraints 138 may also include a minimum run constraint, which identifies the minimum number of slabs 108 to be processed in a given round. For example, the minimum run constraint may identify that each round should process at least thirty-one slabs 108. Another constraint 138 may identify the maximum number of distant yard slabs 108 that may be scheduled in a round, such as by limiting the number of distant yard slabs 108 to eight. In one embodiment, a slab 108 may be placed in a slab "yard," or an area where the slabs may be stored and/or inspected. In a particular embodiment, the slab yard may be separate from the hot mill area 112 processing the slabs 108, and slabs 108 in this slab yard may be referred to as distant yard slabs 108. In this embodiment, the constraint 138 may limit the number of slabs 108 coming from the slab yard that are processed in a round. Yet another constraint 138 may require that slabs 108 belonging to the same customer order be grouped together. Other and/or additional slab sequence constraints 138 may be used without departing from the scope of the present invention.

Database 106 may further store round sequence constraints 140, which identify rules and constraints used to determine the sequence of rounds in a campaign. For example, a round sequence constraint 140 may identify that one round type cannot directly precede or directly follow another round type. Round sequence constraints 140 may also identify the last round type that should be used at the end of a campaign. Round sequence constraints 140 may further identify that the average width of the slabs 108 processed during each round should follow a wide to narrow pattern during a campaign. In addition, round sequence constraints 140 may identify the minimum number of rounds of a particular round type to be used during a campaign, which round types should be grouped together during a campaign, and which round types should be created more often. Other and/or additional round sequence constraints 140 may be used without departing from the scope of the present invention.

In a particular embodiment, slab sequence constraints 138 and round sequence constraints 140 may be classified as "hard" and "soft" constraints. Hard constraints represent constraints 138, 140 that should not be violated during a round or during a campaign. Soft constraints represent constraints 138, 140 that may be violated but which may lead to the creation of inefficient or sub-optimal schedules. As particular examples, the slab sequence constraint 138 to prevent groove formation and the jump constraints may be classified as hard constraints. The round sequence constraint 140 identifying a round type that cannot precede or follow another round type may be a hard constraint, as well as the constraint 140 identifying the last round type of a campaign. The other constraints 138, 140 may be soft constraints. A constraint 138, 140 may also include hard and soft components. For example, the slab sequence constraint 138 that defines the minimum number of slabs 108 in a round may have a soft component (e.g., should have at least forty slabs 108 in a round) and a hard component (e.g., must have at least thirty-one slabs 108 in a round). Also, the round sequence constraint 140 stating that the average width of the slabs 108 processed in the rounds should follow a wide to narrow pattern may have a soft component (e.g., average width may increase by some amount) and a hard component (e.g., average width cannot increase more than some amount). Other classifications of constraints 138, 140 may be used without departing from the scope of the present invention.

In addition, database 106 may store user preferences 142. For example, in one embodiment, server 104 may generate sort values for slabs 108 and then allocate slabs 108 to the rounds in a campaign in order of increasing sort value. User preferences 142 may identify which characteristics or properties of slabs 108 are more or less important to the user in generating the sort values. As a particular example, user preferences 142 may identify that the width 120 of slabs 108 is more important than the status of slabs 108. In this example, the user is informing server 104 that it is more important to schedule slabs 108 according to the width 120 of slabs 108 than it is to schedule slabs 108 according to whether the slabs 108 are late. FIGS. 4–10 illustrate example user preferences 142 and how those preferences may affect the scheduling of slabs 108 during a campaign.

Server 104 may use the above and/or other information in any suitable combination to perform campaign planning operations in system 100. For example, in one embodiment, server 104 may use candidacy rules 136 and slab information 132 to identify which slabs 108 are candidates for the round types 134. Server 104 may also use user preferences 142 to generate sort values and allocate slabs 108 to different rounds. Server 104 may further use slab sequence constraints 138 to sequence the slabs 108 in a round. In addition, server 104 may use round sequence constraints 140 to sequence the rounds during a campaign. In this way, server 104 may identify the different rounds that will be used during a campaign, the slabs 108 that will be processed during each round, the order of slabs 108 to be processed during each round, and the sequence of rounds during the campaign. This produces a schedule of the slabs 108 that will be processed throughout the campaign.

System 100 may allow facility 102 to efficiently schedule the order of slabs 108 to be processed during a campaign. By taking into account the various information 132–142 in database 106 and/or other information, server 104 may efficiently create a schedule that allows more slabs 108 to be processed during a campaign. Server 104 may also produce a schedule that reduces the amount of inventory that facility 102 keeps and/or that increases the useful life of working rolls 124 and backup rolls 126. The increase in the number of slabs 108 processed, the decrease in inventory levels, and/or the increase in the useful life of rolls 124 and 126 may help facility 102 to save money, potentially in significant amounts. In addition, server 104 may take into account user preferences 142, which allows server 104 to create customized schedules based on the preferences and priorities of the user using server 104.

Although FIG. 1 illustrates an example embodiment of system 100, various changes may be made without departing from the scope of the present invention. For example, the components of server 104 may operate on one or more computers at one or more locations. Also, the functionality of server 104 may be implemented using any suitable computing device or devices, such as a server computer, a workstation, a desktop or laptop personal computer, or a personal digital assistant. Other changes may be made to system 100 without departing from the scope of the present invention.

Figure 2A:
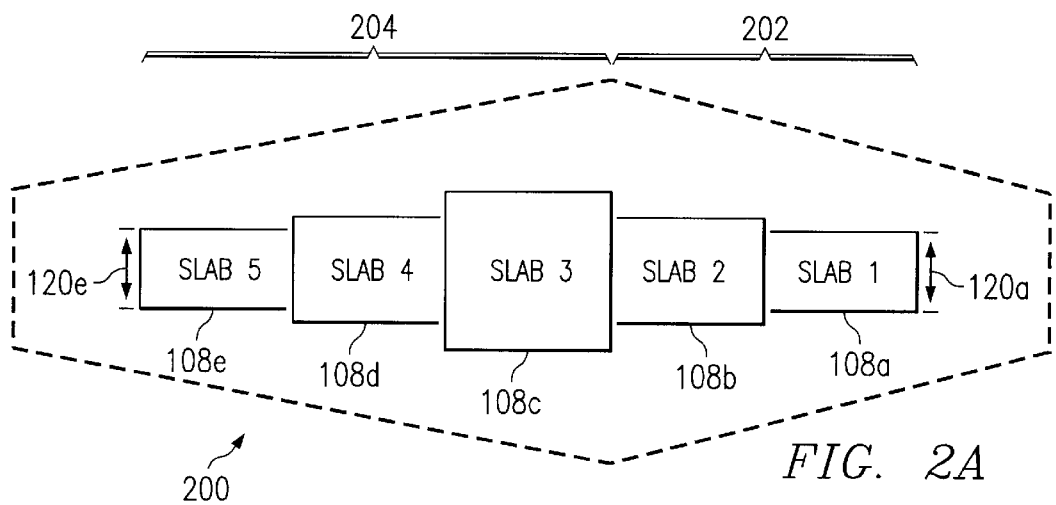
FIGS. 2A and 2B illustrate example sequences of slabs.
Figure 2B:
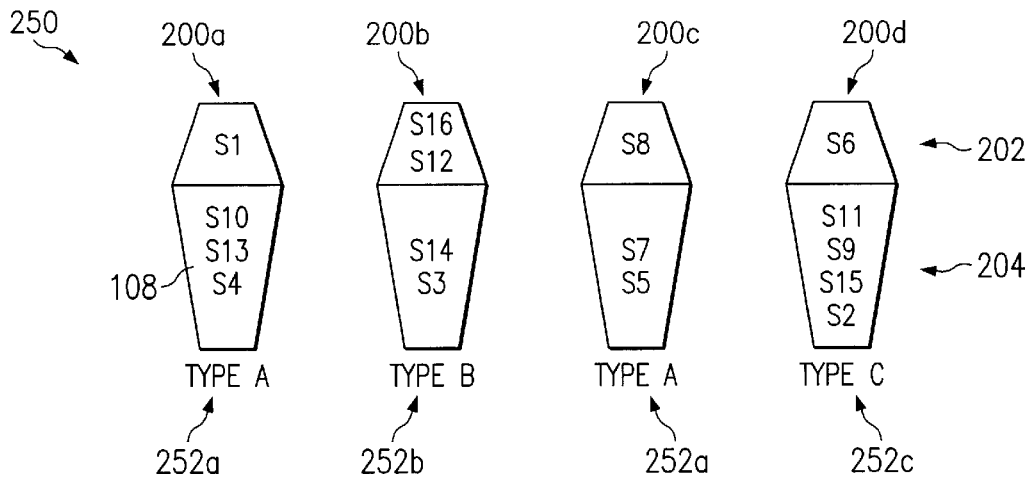

FIGS. 2A and 2B illustrate example sequences of slabs 108. In particular, FIG. 2A illustrates an example round 200 of slabs 108 processed by facility 102, and FIG. 2B illustrates an example campaign 250 of rounds 200. The information shown in FIGS. 2A and 2B are for illustration only. Any other suitable rounds 200 and/or campaigns 250 may be used in system 100 without departing from the scope of the present invention.

In FIG. 2A, round 200 includes a wideout portion 202 and a body portion 204. In the illustrated embodiment, the slabs 108 processed during wideout portion 202 of round 200 follow a narrow-to-wide pattern with respect to the width 120 of slabs 108. In this document, the terms "narrow" and "wide" refer to relative distances and do not correspond to specific dimensions. The slabs 108 processed during wideout portion 202 may have a softer composition compared to the slabs 108 scheduled during body portion 204. The narrow-to-wide pattern of slabs 108 and/or the softer composition of slabs 108 processed during wideout portion 202 is used to warm up the working rolls 124 of hot mill area 112. Working rolls 124 may need to be warmed up, for example, because the previous working rolls 124 may have been replaced at the end of the previous round 200. Wideout portion 202 helps to warm up working rolls 124 so that working rolls 124 may work more efficiently during the remainder of round 200.

In the illustrated embodiment, the slabs 108 processed during the body portion 204 of round 200 follow a wide-to-narrow pattern with respect to the width 120 of slabs 108. After working rolls 124 have been warmed up during wideout portion 202, working rolls 124 may efficiently process slabs 108 during body portion 204. In one embodiment, working rolls 124 process slabs 108 during body portion 204 more efficiently when the slabs 108 follow a wide-to-narrow pattern with respect to width 120. As a result, to use working rolls 124 efficiently, scheduling server 104 may schedule slabs 108 during body portion 204 so that the width 120 of slabs 108 follows the wide-to-narrow pattern. The operators of facility 102 want to use the working rolls 124 efficiently because working rolls 124 may need to be replaced at the end of each round 200. Because the working rolls 124 may be expensive, efficiently using working rolls 124 may allow hot mill area 112 to process more slabs 108 with each set of working rolls 124.

Because a round 200 may include different portions 202 and 204, the slab sequence constraints 138 in database 106 may apply differently to slabs 108 processed during wideout portion 202 and slabs 108 processed during body portion 204. For example, in a particular embodiment, the constraint to prevent groove formation, the minimum run constraint, the round capacity constraint, and the constraint grouping slabs in a customer order may apply to slabs 108 in body portion 204, while the jump constraints and maximum run constraints may apply to slabs 108 in wideout portion 202 and body portion 204. Other and/or additional constraints may apply to wideout portion 202 and/or body portion 204 without departing from the scope of the present invention.

Also, because server 104 may schedule slabs 108 to different portions 202, 204 of round 200, server 104 may also use candidacy rules 136 to identify the "region" candidacy of a slab 108. The region candidacy of a slab 108 refers to the candidacy of slab 108 in the wideout portion 202 and/or body portion 204 of round 200. For example, a slab 108 formed from softer materials may be a candidate for a wideout portion 202 of a round 200 because the slab 108 may be used to warm up working rolls 124. A slab 108 requiring a high furnace temperature may be a candidate for body portion 204 because the slab 108 may require too high a temperature for wideout portion 202.

FIG. 2B illustrates an example campaign 250, which included four rounds 200. In the illustrated embodiment, each round 200 includes wideout portion 202 and body portion 204. The slabs 108 scheduled during wideout portions 202 and body portions 204 are labeled as "S1" through "S16" in FIG. 2B. Also, each round 200 in campaign 250 is one of three example round types 252. As shown in FIG. 2B, rounds 200a and 200c are examples of a first round type 252a, round 200b is an example of a second round type 252b, and round 200d is an example of a third round type 252c.

To schedule slabs 108 during campaign 250, server 104 may access database 106 and retrieve round type information 134. Using this information, server 104 may identify which round types 252 are available during campaign 250. Server 104 may also retrieve slab information 132 and candidacy rules 136 from database 106. Using this information, server 104 may identify the candidacy of each slab 108 in the round types 252, identifying which of the round types 252 within which each slab 108 may be processed. Server 104 may further access database 106 and retrieve user preferences 142. Using user preferences 142, server 104 may generate a sort value for each slab 108 and rank the slabs 108 in order of their sort values. After that, server 104 may begin allocating slabs 108 to rounds 200. When at least one round 200 is full, such as when the footage of slabs 108 in a round 200 has reached a limit, server 104 may use slab sequence constraints 138 to schedule the slabs 108 within that round 200. In addition, server 104 may use round sequence constraints 140 to order the rounds 200 in campaign 250. In this manner, server 104 may assign slabs 108 to different rounds 200 in campaign 250 and/or to different portions of a round 200.

Each round 200 may be followed by the replacement of working rolls 124. Because of this, in one embodiment, server 104 may attempt to allocate slabs 108 to a round 200 so that the round 200 is as full as possible. As a result, each round 200 may be processing as close to the maximum allowable footage of slabs 108 as possible. By processing as much footage as possible, facility 102 may use working rolls 124 more efficiently than previously achieved. This helps facility 102 to save money by helping to ensure that working rolls 124 are being used efficiently to process more materials.

While in this example the widths 120 of slabs 108 follow a narrow-to-wide pattern and then a wide-to-narrow pattern during round 200, other characteristics of slabs 108 may vary more frequently. For example, the gauge 122 of the slabs 108 may vary between following a wide-to-narrow pattern and a narrow-to-wide pattern repeatedly in a round 200 and in a campaign 250.

The information contained in FIGS. 2A and 2B is for illustration only. Various changes may be made to FIGS. 2A and 2B without departing from the scope of the present invention. For example, while FIG. 2B illustrates four rounds 200 and three round types 252 during campaign 250, any suitable number of rounds 200 and/or round types 252 may be used in a campaign 250. In one embodiment, a campaign 250 may have a duration of one to three weeks. In a particular embodiment, each day of the week may accommodate three rounds 200, and a campaign 250 of one week includes twenty-one rounds 200. During this campaign 250, server 104 may schedule twenty rounds 200 to process slabs 108 and reserve one round 200 for maintenance, repairs, and other work on facility 102. Also, any suitable number of slabs 108 may be processed during each round 200, and any suitable number of slabs 108 may be processed in wideout portion 202 and/or body portion 204 of round 200. In addition, the order of the slabs 108 during rounds 200 and during campaign 250 is for illustration only. Slabs 108 may have any suitable order in rounds 200 and/or campaign 250 without departing from the scope of the present invention.

Figure 3A:
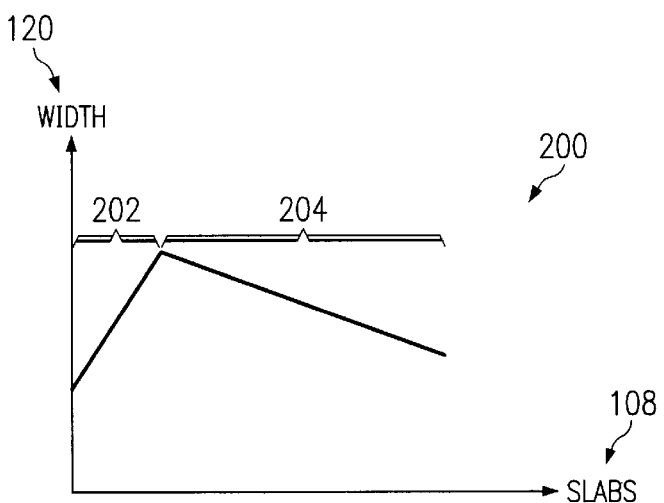
Figure 3B:
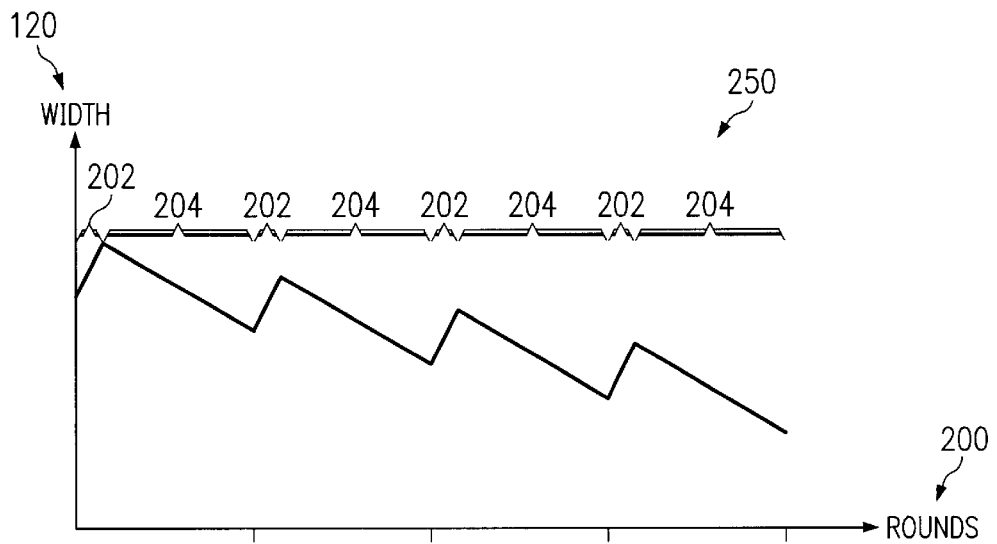

FIGS. 3A through 3C illustrate example variations in the width 120 of the slabs 108 processed during a campaign 250. In particular, FIG. 3A illustrates the widths 120 of slabs 108 processed in a round 200, FIG. 3B illustrates the widths 120 of slabs 108 processed during a campaign 250, and FIG. 3C illustrates the average width of the slabs 108 processed during each round 200 of campaign 250. The information contained in FIGS. 3A–3C is for illustration only. Other and/or additional variations in the widths 120 of slabs 108 may be used without departing from the scope of the present invention.

FIG. 3A illustrates how the widths 120 of slabs 108 vary during a round 200. As shown in FIG. 3A, the widths 120 of the slabs 108 being processed by hot mill area 112 may increase during wideout portion 202 of round 200. This preferably allows working rolls 124 to warm up during round 200. Also, the width 120 of slabs 108 may decrease during body portion 204. This wide-to-narrow pattern during body portion 204 preferably allows working rolls 124 to efficiently process slabs 108.

FIG. 3B illustrates how the widths 120 of slabs 108 may vary during rounds 200 of a campaign 250. As shown in FIG. 3B, the widths 120 of slabs 108 may follow a similar pattern during each round 200 during campaign 250. For example, each round 200 may have a wideout portion 202 and a body portion 204. The alternating wideout portions 202 and body portions 204 may result from the replacement of working rolls 124 during each round 200. Because working rolls 124 are preferably warmed up after being replaced, each round 200 preferably includes a wideout portion 202. After working rolls 124 have been warmed up, working rolls 124 may process slabs 108 during body portions 204 of rounds 200 in a wide-to-narrow pattern.

Although FIG. 3B illustrates each round 200 starting when the previous round 200 ends, wideout portion 202 and/or body portion 204 may include down time when facility 102 stops processing slabs 108. This may include, for example, facility 102 changing working rolls 124, performing other maintenance on hot mill area 112, or other suitable activities.

FIG. 3C illustrates how the average width 260 of slabs 108 may change during rounds 200 of campaign 250. As shown in FIG. 3C, the average width 260 of slabs 108 may decrease during campaign 250. As explained above, one of the round sequence constraints 140 may state that the average width 260 of the slabs 108 processed during campaign 250 should follow a wide-to-narrow pattern during campaign 250. This is also illustrated in FIG. 3B, where the width 102 of slabs 108 during the later rounds 200 is smaller than the widths 120 of slabs 108 processed during earlier rounds 200.

Although FIGS. 3A–3C illustrate example variations in the widths 120 of slabs 108 processed during rounds 200 and campaign 250, various changes may be made to FIGS. 3A–3C without departing from the scope of the present invention.

For example, wideout portion 202 and/or body portion 204 of rounds 200 may have any suitable duration. Also, any suitable number of rounds 200 may be used in a campaign 250. In addition, FIGS. 3A–3C illustrate example sequences of slabs 108 during a round 200 and/or a campaign 250. Server 104 may generate any other suitable schedule of slabs 108 without departing from the scope of the present invention. For example, the average width 260 of the slabs 108 in rounds 200 may include some increases and decreases during campaign 250.

FIG. 4 illustrates an example sort value 400 used to control the order in which slabs 108 are allocated to rounds 200 in a campaign 250. In the illustrated embodiment, sort value 400 includes a width value 402, a gauge value 404, a status value 406, a preferred round type value 408, and a number of round types value 410. In this document, the values 402–410 that form sort value 400 may be referred to as "property values" because the values are associated with the properties of slabs 108. Other embodiments of sort value 400 may be used without departing from the scope of the present invention.

Width value 402 represents the width 120 of a slab 108 associated with sort value 400. Gauge value 404 represents the gauge 122 of the slab 108 associated with sort value 400. Status value 406 represents the status of slab 108 associated with the sort value 400, such as whether the slab 108 is late. Preferred round type value 408 identifies the type 252 of round 200 to which a user prefers slab 108 be assigned, if any. Number of round types value 410 identifies the number of different round types 252 for which slab 108 is a candidate. Example values 402–410 are illustrated in FIGS. 5–9, respectively, which are described below.

In one embodiment, server 104 uses the sort value 400 associated with each slab 108 to rank slabs 108. In a particular embodiment, server 104 ranks slabs 108 in order of increasing sort value 400. Server 104 then assigns slabs 108 to rounds 200 in order of their rank. For example, the slab 108 with the lowest sort value 400 may be allocated to a round 200 first, the slab 108 with the next highest sort value 400 may be allocated to a round 200 second, and so on.

In one embodiment, the position of a value 402–410 within sort value 400 determines the importance of that value 402–410 in determining how slabs 108 are allocated to rounds 200. In a particular embodiment, server 104 ranks slabs 108 in order of increasing sort value 400, and width value 402 plays the most significant role in determining when a slab 108 is allocated to a round 200. For example, a slab 108 associated with a width value 402 of "1" may be allocated earlier than another slab 108 associated with a width value 402 of "8" regardless of the other values 404–410 for these slabs 108. The gauge value 404 may be the second most significant value and may therefore play the second most significant role in determining when slabs 108 are allocated. The number of round types value 410 may be the least significant value and may have the least significant role in determining when slabs 108 are allocated. In one embodiment, the position of each value 402–410 in sort value 400 may be determined from user preferences 142 in database 106. In this manner, a particular user may define the relative importance of values 402–410, which determines how slabs 108 are allocated to rounds 200. One user may believe that width value 402 is the most important factor, while another may believe that the status value 406 is the most important factor. Server 104 takes into account the user's preferences by determining how to generate sort value 400, which also determines the order in which slabs 108 are allocated to rounds 200. As a result, server 104 may customize the sequencing of the slabs 108 in campaign 250 based, at least in part, on user preferences 142.

Although FIG. 4 illustrates one example of a sort value 400, various changes may be made to sort value 400 without departing from the scope of the present invention. For example, any other and/or additional values may be used to produce sort values 400 in system 100. Also, values 402–410 may occur in any suitable order in sort value 400. In addition, server 104 may use any suitable algorithm to generate sort values 400 based on any combination of values 402–410.

FIG. 5 illustrates an example width table 500 used to generate sort value 400. In particular, table 500 may be used to identify a width value 402 in sort value 400. Table 500 includes one or more entries 502. Each entry 502 contains a width range index 504 and a width value 506. Each width range index 504 identifies a range of widths 120 that correspond to a width value 506. In one embodiment, when generating a sort value 400 for a slab 108, server 104 may access table 500 and determine the index 504 in which the width 120 of slab 108 falls. Server 104 may then use the width value 506 associated with that index 504 as width value 402 in sort value 400. In the illustrated example, if a slab 108 has a width 120 of fifty-six inches, server 104 determines that the third entry 502 contains an index 504 that includes the width 120 of slab 108. Server 104 therefore uses a width value 506 of "3" as the width value 402 in sort value 400. Other embodiments of table 500 may be used without departing from the scope of the present invention.

FIG. 6 illustrates an example gauge table 600 used to generate sort value 400. In particular, table 600 may be used to identify a gauge value 404 in sort value 400. Table 600 includes one or more entries 602, and each entry 602 contains a gauge range index 604 and a gauge value 606. Each gauge range index 604 identifies a range of gauges 122 that correspond to a gauge value 606. In one embodiment, when generating a sort value 400 for a slab 108, server 104 may access table 600 and determine the index 604 in which gauge 122 of slab 108 falls. Server 104 may then use the gauge value 606 associated with that index 604 as gauge value 404 in sort value 400. In the illustrated example, if a slab 108 has a gauge 122 of 0.43 inches, server 104 determines that the third entry 602 contains an index 604 that includes the gauge 122 of slab 108. Server 104 therefore uses a gauge value 606 of "3" as the gauge value 404 in sort value 400. Other embodiments of table 600 may be used without departing from the scope of the present invention.

FIG. 7 illustrates an example status table 700 used to generate sort value 400. In particular, table 700 may be used to identify a status value 406 in sort value 400. Table 700 includes one or more entries 702, and each entry 702 contains a status index 704 and a status value 706. Other embodiments of table 700 may be used without departing from the scope of the present invention.

In the illustrated embodiment, a slab 108 may have a status of late, current, or future. The status of a slab 108 may depend, at least in part, on the due date of the slab 108 and the time period covered by the current campaign 250. If the due date of the slab 108 falls before the beginning of the current campaign 250, the slab 108 is late. If the due date of slab 108 falls within the current campaign 250, the slab 108 is current. If the due date of slab 108 falls after the end of the current campaign 250, the slab 108 is a future slab.

When generating a sort value 400 for a slab 108, server 104 may access table 700 and determine which index 704 matches the status of slab 108. Server 104 may then use the status value 706 associated with that index 704 as status value 406 in sort value 400. In the illustrated example, if a slab 108 has a due date after the current campaign 250, server 104 determines that the slab 108 is a future slab, and server 104 uses a status value 706 of "3" as the status value 406 in sort value 400.

FIG. 8 illustrates an example preferred round type table 800 used to generate sort value 400. In particular, table 800 may be used to identify a preferred round type value 408 in sort value 400. Table 800 includes one or more entries 802, each entry 802 containing a preferred round type index 804 and a preferred round type value 806. In one embodiment, a user may have a preference as to which round type 252 a slab 108 is processed in, and entries 802 identify the various round types 252 in which the slab 108 may be processed. Table 800 identifies a preferred round type value 806 associated with each of the round types 252. Table 800 may also include an entry 802 identifying when the user has no referred round type 252. Server 104 may use table 800 to identify a preferred round type value 806 associated with a slab 108, and server 104 may use that value 806 as preferred round type value 408 in sort value 400. In the illustrated example, if the user has no preference as to which round type 252 a slab 108 should be allocated, server 104 uses a preferred round type value 806 of "4" as the value 408 in sort value 400. Other embodiments of table 800 may be used without departing from the scope of the present invention.

FIG. 9 illustrates an example number of round types table 900 used to generate sort value 400. In particular, table 900 may be used to identify a number of round types value 410 in sort value 400. Table 900 includes one or more entries 902, and each entry 902 contains a number of round types index 904 and a number of round types value 906. When the user and/or server 104 identifies the number of round types 252 for which slab 108 is a candidate, server 104 may access table 900 and identify a number of round types value 906 associated with slab 108. The number of round types value 906 may then be used as value 410 and sort value 400. Other embodiments of table 900 may be used without departing from the scope of the present invention.

The values shown in FIGS. 5–9 are for illustration only. Various changes may be made to tables 500–900 without departing from the scope of the present invention. For example, any suitable values and/or number of entries may be used in tables 500–900. Also, the values illustrated in tables 500–900 may be defined by a user and/or server 104. For example, server 104 may include default tables 500–900, and a user may define customized tables 500–900 to be stored as user preferences 142 in database 106. Further, while each table 500–900 shows an example assignment of an index to a value, any other suitable assignments may be used. In addition, table 900 illustrates that the values of index 904 are the same as the values 906. As a result, server 104 may be able to determine a sort value 400 without accessing table 900. In addition, server 104 could use any other suitable data structure or structures to store the information contained in tables 500–900. Other changes may be made without departing from the scope of the present invention.

Figures 10, 13:
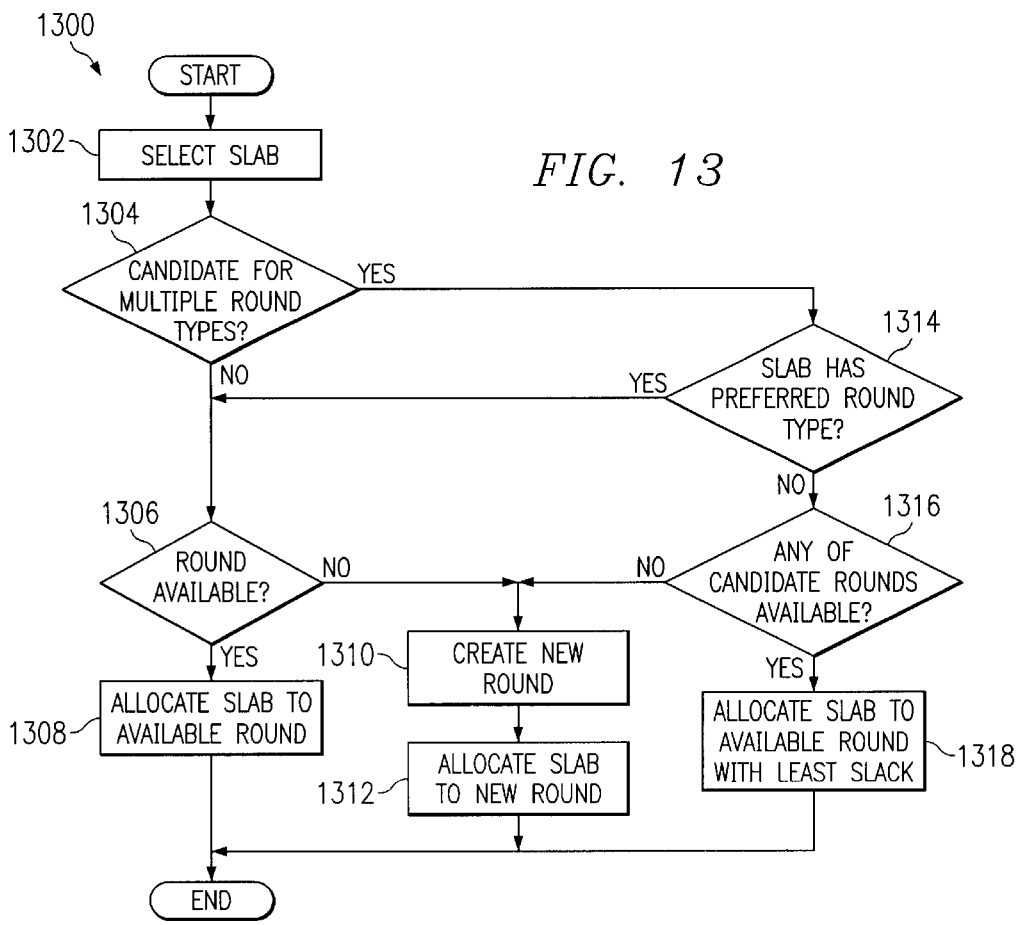
FIG. 10 illustrates an example slab table containing information about slabs processed during a campaign.
FIG. 13 illustrates an example method for allocating a slab to a round during a campaign.

FIG. 10 illustrates an example slab table 1000 containing information about slabs 108 processed during campaign 250. In the illustrated embodiment, slab table 1000 includes one or more entries 1002 that correspond to different slabs 108 being processed by facility 102. Each entry 1002 includes a slab identifier 1004, a region identifier 1006, a width identifier 1008, a gauge identifier 1010, a status identifier 1012, a preferred round identifier 1014, a round candidacy identifier 1016, and a sort value 400. Other and/or additional information may be used in slab table 1000 without departing from the scope of the present invention.

Slab identifier 1004 identifies the slab 108 processed by facility 102. In the illustrated embodiment, slab identifiers 1004 comprise numbers ranging from "1" to "10." Other suitable and/or additional identifiers may be used without departing from the scope of the present invention. Region identifier 1006 identifies the portion of a round 200 that slab 108 may be assigned to, such as wideout portion 202 or body portion 204. Width identifier 1008 identifies the width 120 of a slab 108. Gauge identifier 1010 identifies the gauge 122 of a slab 108. Status identifier 1012 identifies the current status of a slab 108. Preferred round identifier 1014 identifies whether a user has identified a preferred round type 252 for slab 108, and if so what the preferred round type 252 is. Round candidacy 1016 identifies one or more round types 252 for which slab 108 is a candidate. A slab 108 may be a candidate for one, some, all, or none of the available round types 252.

Using identifiers 1008–1016, server 104 may generate a sort value 400 for each slab 108. In the illustrated example, entry 1002a has a width 120 of fifty-five inches, which corresponds to a width value 506 of "3." A gauge 122 of 0.45 inches corresponds to a gauge value 606 of "2," a status of "late" corresponds to a status value 706 of "1," and a preferred round type 252 of "none" corresponds to a preferred round type value 806 of "4." Since slab 108 is a candidate for one round type 252, slab 108 has a number of round types value 906 of "1." Combining the various values produces a sort value 400 of "32141." By identifying a sort value 400 for each entry 1002 in slab table 1000, server 104 may generate a sort value 400 for each slab 108 being processed in a campaign 250. By sorting entries 1002a–1002j in order of increasing sort value 400, server 104 would allocate slab 108 associated with entry 1002b to a round 200 first since entry 1002b has the lowest sort value. Similarly, the slab 108 associated with entry 1002e would be allocated to a round 200 last because entry 1002e has the largest sort value. Even though slab 108 corresponding to entry 1002e is late, the user has indicated through user preferences 142 that the width 120 of slab 108 is the most important factor in determining the order of allocation. Had the user indicated that the status value 406 is the most important factor in determining the order of allocation, slabs 108 would be allocated to rounds 200 in a different order.

Although FIG. 10 illustrates one example of a slab table 1000, various changes may be made to table 1000 without departing from the scope of the present invention. For example, the values illustrated in FIG. 10 are for illustration only. Any other and/or additional values may be used without departing from the scope of the present invention. Also, server 104 could use any other suitable data structure to store the information contained in slab table 1000. In addition, the information contained in table 1000 could be divided and stored in separate tables or other suitable data structures.

Figure 11:
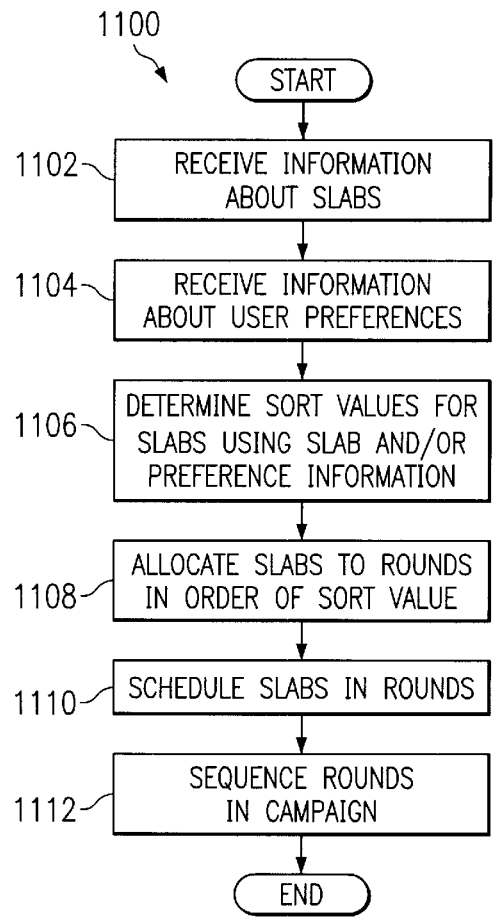
FIG. 11 illustrates an example method for campaign planning.

FIG. 11 illustrates an example method 1100 for campaign planning. Server 104 receives information about slabs 108 at step 1102. This may include, for example, server 104 retrieving slab information 132 from database 106. Slab information 132 may identify characteristics or properties of slabs 108, such as the length 118, width 120, gauge 122, finishing temperature, due date, and composition of slabs 108. Server 104 receives information about user preferences at step 1104. This may include, for example, sever 104 retrieving user preferences 142 from database 106. As a particular example, this may include retrieving information identifying how to construct sort values 400 for slabs 108.

Server 104 determines a sort value 400 for each slab 108 using the slab information 132, user preferences 142, and/or any other suitable information from database 106 at step 1106. This may include, for example, server 104 accessing tables 500–900, illustrated in FIGS. 5–9, to determine sort values 400 for slabs 108. Server 104 allocates the slabs 108 to one or more rounds 200 at step 1108. This may include, for example, server 104 allocating slabs 108 to rounds 200 in order of increasing sort value 400.

When at least one round 200 is "full," server 104 schedules the slabs 108 in the round 200 at step 1110. This may include, for example, server 104 executing a program to schedule slabs 108 in round 200. In a particular embodiment, server 104 uses an INSERTION OPTIMIZER developed by I2 TECHNOLOGIES, INC. to schedule slabs 108 in a round 200. The program used by server 104 may be a recursive program that takes multiple passes through the list of slabs 108 to schedule slabs 108 in a round 200. As a particular example, server 104 may execute the program for sixty iterations through the list of slabs 108 in round 200. During the iterations, one or more slabs 108 may be removed from a round 200. For example, server 104 may determine that a slab 108 cannot be scheduled in a round 200 without violating a hard slab sequence constraint 138.

Because one or more slabs 108 may be removed from round 200, server 104 may allocate more slabs 108 to a round 200 during step 1108 than round 200 could process. For example, a round 200 may have a maximum total footage of ten thousand feet, meaning that the round 200 can process ten thousand feet of slabs 108. In allocating slabs 108 to round 200, server 104 may allocate up to fifteen thousand feet of slabs 108 to that round 200. In this embodiment, a full round 200 is a round that has been allocated fifty percent more footage than that round 200 can actually process. During step 1110, server 104 may remove one or more slabs 108 from that round 200, helping to ensure that the slabs 108 scheduled in round 200 do not exceed the actual maximum footage allowed. Although server 104 has been described as allocating fifty percent more footage to a round 200 than that round 200 can actually process, other percentages or values may be used without departing from the scope of the present invention.

Server 104 sequences the rounds 200 in a campaign 250 at step 1112. This may include, for example, server 104 ensuring that any round sequence constraints 140 are enforced in scheduling rounds 200 in a campaign 250. This may also include server 104 executing a program to schedule the rounds 200 in campaign 250. In a particular embodiment, server 104 may execute a LINE OPTIMIZER developed by I2 TECHNOLOGIES, INC to create a schedule for campaign 250. Campaign 250 ultimately includes a schedule of rounds 200, and each round 200 includes a schedule of slabs 108.

While FIG. 11 illustrates one example method 1100 for campaign planning, various changes may be made to method 1100 without departing from the scope of the present invention. For example, server 104 may receive information about user preferences before receiving information about slabs 108.

Figure 12:
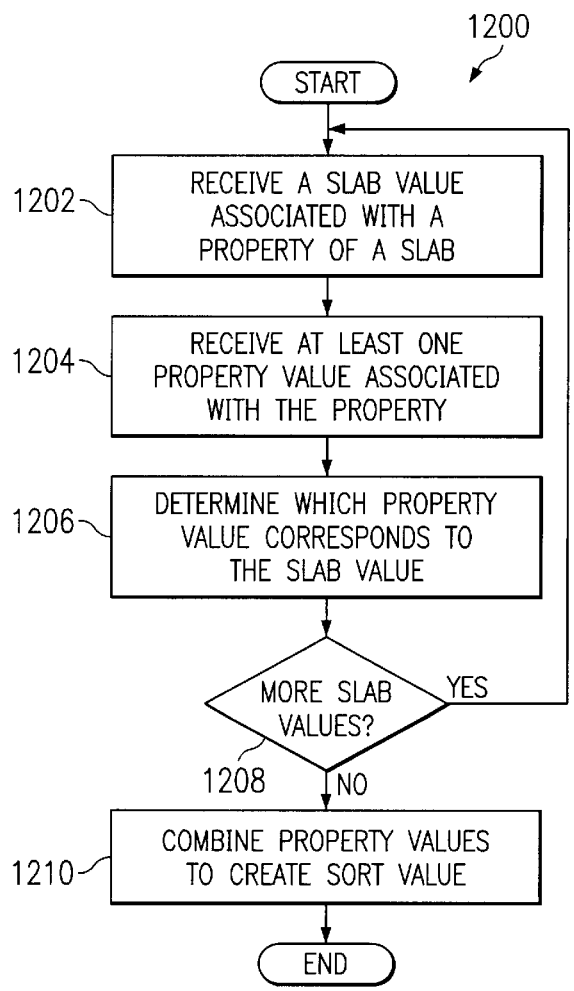
FIG. 12 illustrates an example method for generating a sort value for a slab.

FIG. 12 illustrates an example method 1200 for generating a sort value 400 for a slab 108. Server 104 receives a slab value associated with a property of a slab 108 at step 1202. A slab value may, for example, identify the width 120, gauge 122, status, preferred round type 252, or number of candidate round types 252 associated with slab 108. Server 104 receives at least one property value associated with the property of slab 108 at step 1204. This may include, for example, server 104 accessing one or more of tables 500–900, which are illustrated in FIGS. 5–9. The information contained in tables 500–900 may include default values and/or user-defined values. Server 104 determines which property value corresponds to the slab value at step 1206. This may include, for example, server 104 accessing one of tables 500–900, comparing the slab value to the index of that table, and determining the value associated with that index. For example, if a slab value represents the width 120 of a slab 108, server 104 may access table 500, compare the slab value to width indices 504, and determine which width value 506 corresponds with that slab value. Server 102 determines whether more slab values are available at step 1208. This may include, for example, server 104 determining whether a property value has been generated for each of values 402–410 in sort value 400. If more slab values are available, server 104 returns to step 1202 to receive another slab value. This may include, for example, server 104 determining a property value for each of width 120, gauge 122, status, preferred round type 252, and number of candidate round types 252 associated with slab 108. Server 104 combines the property values to create a sort value 400 at step 1210. This may include, for example, server 104 concatenating each of values 402–410 together to produce sort value 400.

FIG. 13 illustrates an example method 1300 for allocating a slab 108 to a round 200 during a campaign 250. Server 104 selects a slab 108 at step 1302. This may include, for example, server 104 selecting the slab 108 with the lowest sort value 400. Server 104 determines whether the slab 108 is a candidate for multiple round types 252 at step 1304. This may include, for example, server 104 determining whether the round type candidacy identifier 1016 associated with slab 108 identifies one or multiple round types 252. If a slab 108 is a candidate for a single round type 252, server 104 determines whether a round 200 of that type 252 is available at step 1306. In one embodiment, a round 200 is "available" when the slab 108 may be allocated to that round 200 without that round 200 exceeding one hundred fifty percent of its maximum allowable footage. If a round 200 of the identified type 252 is available at step 1306, server 104 allocates slab 108 to the available around 200 at step 1308. Otherwise, server 104 creates a new round 200 at step 1310. This may include, for example, server 104 creating a new round 200 of the identified round type 252. Server 104 then allocates the slab 108 to the new round 200 at step 1312.

If a slab 108 is a candidate for multiple round types 252 at step 1304, server 104 determines whether the slab 108 has a preferred round type 252 at step 1314. This may include, for example, server 104 determining whether preferred round type identifier 1014 identifies a preferred round type 252 or no preference. If the slab 108 has a preferred round type 252, server 104 returns to step 1306 to determine if a round 200 of the preferred type 252 is available. If so, server 104 allocates the slab 108 to the available preferred round 200 at step 1308. Otherwise, server 104 creates a new round 200 at step 1310 and allocates slab 108 to the new round 200 at step 1312.

If slab 108 has no preferred round type 252 at step 1314, server 104 determines whether any of the candidate round types 252 are available at step 1316. If no rounds 200 of the candidate round types 252 are available, server 104 returns to step 1310 to create a new round 200. The new round 200 may be any of the round types 252 identified by round type candidacy identifier 1016. Server 104 then allocates the slab 108 to the new round 200 at step 1312. Otherwise, if at least one of the candidate rounds 200 is available at step 1316, server 104 allocates slab 108 to the available round 200 with the least slack at step 1318. In one embodiment, the "slack" of a round 200 refers to the difference between one hundred fifty percent of the maximum allowable footage for round 200 and the total footage of slabs 108 allocated to that round 200. At that point, method 1300 ends. Slab 108 has been assigned to one round 200 in campaign 250.

While FIG. 13 illustrates one example of a method 1300 for allocating slabs 108 to rounds 200, various changes may be made to method 1300 without departing from the scope of the present invention. For example, in determining whether to allocate a slab 108 to a round 200, server 104 may also determine whether the width 120 of slab 108 is at least three inches wider or narrower than the other slabs 108 allocated to round 200. In this embodiment, server 104 may not allocate the slab 108 to round 200 if the width 120 of slab 108 is sufficiently similar to the widths 120 of the slabs 108 already allocated to round 200. This may help reduce or eliminate the likelihood that server 104 will allocate slabs 108 having the same width 120 to a round 200.

Figure 14:
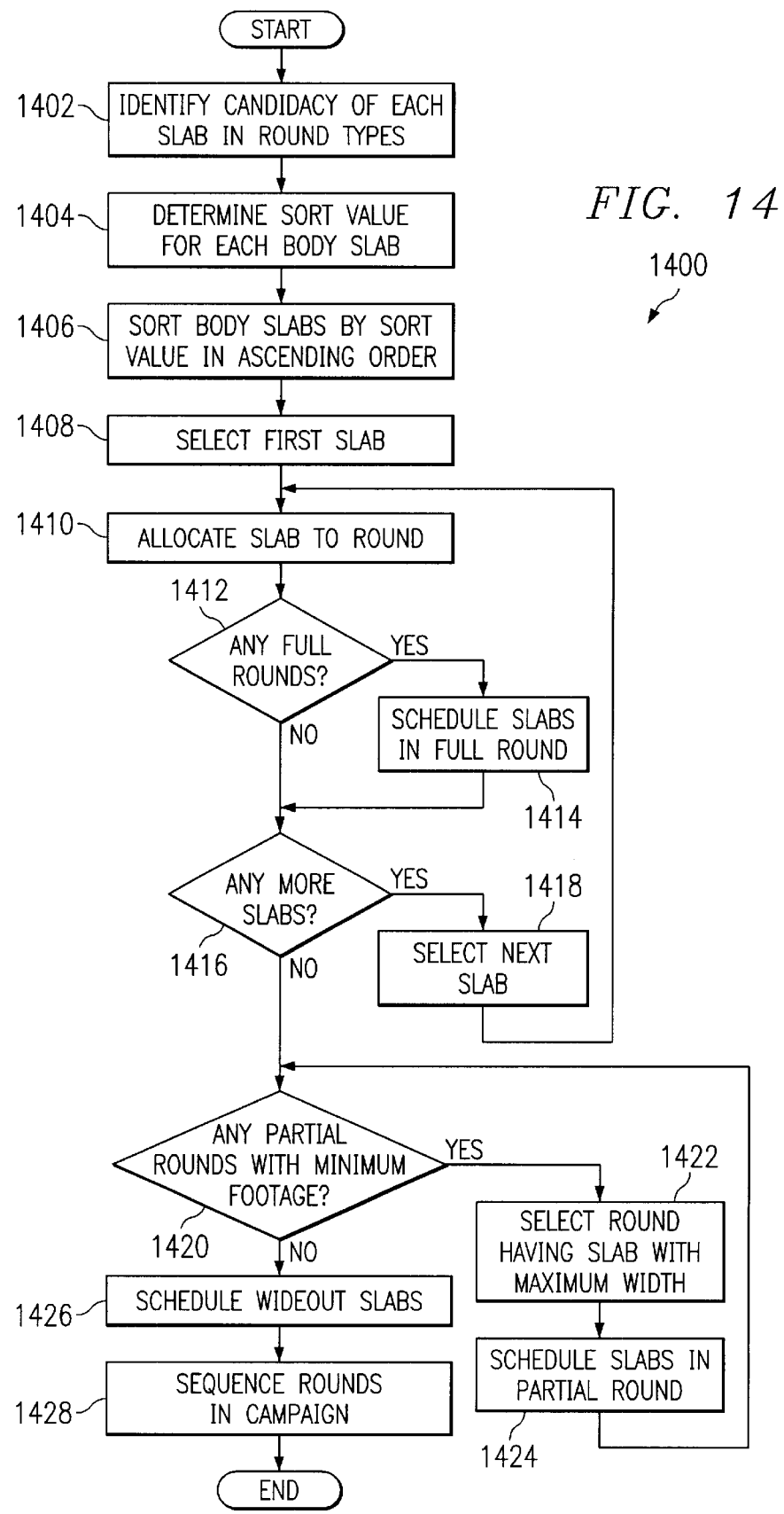
FIG. 14 illustrates another example method for campaign planning.

FIG. 14 illustrates another example method 1400 for campaign planning. Server 104 identifies the candidacy of each slab 108 in round types 252 at step 1402. This may include, for example, server 104 accessing round type information 134 to identify the round types 252 available. This may also include server 104 accessing slab information 132 and candidacy rules 136 to identify the round type candidacy identifiers 1016 for each slab 108. This may further include server 104 identifying which of slabs 108 will be assigned to wideout portions 202 of rounds 200 and which will be assigned to body portions 204 of rounds 200. Server 104 determines a sort value 400 for each body slab 108 at step 1404. This may include, for example, server 104 using the method illustrated in FIG. 12. Server 104 sorts the body slabs 108 by sort value 400 at step 1406. This may include, for example, server 104 sorting the slabs 108 in order of ascending sort value 400.

Server 104 selects the first slab 108 at step 1408. The first slab 108 selected may, for example, have the lowest sort value 400. Server 104 allocates slab 108 to a round 200 at step 1410. This may include, for example, server 104 using the method illustrated in FIG. 13 to allocate slab 108 to a round 200.

Server 104 determines whether any rounds 200 are full at step 1412. This may include, for example, server 104 determining whether the total footage of the slabs 108 allocated to a round 200 equals or exceeds one hundred fifty percent of that round's actual maximum footage. If there are any full rounds 200, server 104 schedules the slabs 108 in the full round 200 at step 1414. This may include, for example, server 104 executing the INSERTION OPTIMIZER. In a particular embodiment, server 104 executes the INSERTION OPTIMIZER for sixty passes through the list of slabs 108 in the full round 200. During the scheduling at step 1414, one or more slabs 108 may be removed from round 200.

If no full rounds existed at step 1412 or after step 1414, server 104 determines whether there are more slabs 108 available at step 1416. This may include, for example, server 104 determining whether there are any slabs 108 that are not currently allocated to a round 200. If there are additional slabs 108, server 104 selects the next slab 108 at step 1418. Server 104 then returns to step 1410 to allocate the next slab 108 to a round 200. This process of allocating slabs 108 to rounds 200 and scheduling full rounds 200 continues until no full rounds 200 remain and no more slabs 108 remain to be allocated.

At this point, server 104 determines whether slabs 108 allocated to a partial round 200 exceed the minimum footage requirement for that round at step 1420. A "partial" round 200 may refer to a round having allocated slabs 108 that exceed the actual maximum footage for that round but which do not exceed one hundred fifty percent of the actual maximum footage. If any partial rounds 200 having the minimum footage exist, server 104 selects the round 200 having the slab 108 with the largest width 120 at step 1422. This may include, for example, server 104 examining the slabs 108 allocated to the partial rounds 200 and identifying the slab 108 with the largest width 120. Server 104 schedules the slabs 108 in the partial round 200 at step 1424. This may include, for example, server 104 executing the INSERTION OPTIMIZER. Server 104 returns to step 1420 to determine if any other partial rounds 200 meet the minimum footage requirements. This process continues until no more partial rounds 200 remain with the minimum footage. At this point, server 104 has created and scheduled the body portions 204 of each round 200 in campaign 250.

Server 104 next schedules the wideout slabs 108 at step 1426. This may include, for example, server 104 executing the INSERTION OPTIMIZER for the wideout slabs 1426. In one embodiment, server 104 executes the INSERTION OPTIMIZER for sixty passes through the list of wideout slabs 108. The INSERTION OPTIMIZER schedules the wideout slabs 108 to the wideout portions 202 of rounds 200. This completes the creation of the rounds 200 in campaign 250. Each round 200 has a wideout portion 202 with at least one slab 108 and a body portion 204 with at least one slab 108.

Server 104 then sequences the rounds 200 in campaign 250 at step 1428. This may include, for example, server 104 executing the LINE OPTIMIZER. In a particular embodiment, campaign 250 has a duration of one week, and each day includes three rounds 200. In this embodiment, the LINE OPTIMIZER schedules twenty rounds 200 during the twenty-one slots in campaign 250. The empty slot is reserved for repairing and maintaining facility 102.

FIG. 15 illustrates yet another example method 1500 for campaign planning. Server 104 identifies the candidacy of each slab 108 in round types 252 at step 1502. Server 104 also determines a sort value 400 for each body slab 108, and server 104 sorts the body slabs 108 by sort value 400 at step 1506.

Server 104 selects the first slab 108 at step 1508, and server 104 allocates slab 108 to a round 200 at step 1510. Server 104 determines whether any additional slabs 108 remain at step 1512. This may include, for example, server 104 determining whether any slabs 108 are not allocated to a round 200. If additional slabs 108 remain, server 104 selects the next slab at step 1514. Server 104 then returns to step 1510 to allocate that slab 108 to a round 200. This process continues until all slabs 108 have been allocated to a round 200.

Server 104 then schedules slabs 108 in rounds 200 at step 1506. This may include, for example, server 104 executing the INSERTION OPTIMIZER for each round 200 created by server 104. Server 104 then determines whether any slabs 108 have been removed from rounds 200 at step 1518. This may include, for example, determining whether the INSERTION OPTIMIZER has removed any allocated slabs 108 from the rounds 200. If one or more slabs 108 had been removed from rounds 200, server 104 selects the first omitted slab 108 at step 1520, and server 104 returns to step 1510 to allocate slab 108 to a round 200. This process continues again until server 104 has allocated all of the omitted slabs 108 to rounds 200, and server 104 schedules the slabs 108 in rounds 200 again at step 1516. This process continues until all slabs 108 have been allocated and scheduled within rounds 200, or until server 104 determines that one or more slabs 108 cannot be scheduled in the current campaign 250.

At this point, server 104 has allocated slabs 108 to body portions 204 of rounds 200. Server 104 then schedules the wideout slabs 108 at step 1522, and server 104 schedules the rounds 200 in campaign 250 at step 1524.

The methods illustrated in FIGS. 14 and 15 are different methods for campaign planning. Method 1400 illustrated in FIG. 14 schedules slabs 108 in a round 200 each time a round 200 becomes full. In contrast, method 1500 in FIG. 15 schedules the slabs 108 in rounds 200 after all slabs 108 have been allocated to rounds 200. This may, for example, change the scheduling and ordering of the slabs in campaign 250. Also, in one embodiment, server 104 may perform step 1524 before performing step 1516 in method 1500. In this embodiment, server 104 sequences the rounds 200 in campaign 250 before scheduling slabs 108 in rounds 200. This again may alter the scheduling of slabs 108 in campaign 250 and produce a different schedule.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A method for campaign planning, comprising:

receiving at least two slab values for each of a plurality of slabs, each slab having at least two properties, each property of a slab having a corresponding slab value;

receiving a preference value for each of one or more preferenced properties of the slabs, the preference value for a preferenced property of the slabs identifying a relative importance of the preferenced property of the slabs compared to one or more other properties of the slabs in determining an order in which the slabs are to be allocated to a plurality of rounds in a campaign;

generating a sort value for each slab, the sort value for a slab depending at least partially on the slab values associated with the properties of the slab and the preference values for the one or more preferenced properties of the slab; and allocating the slabs to the plurality of rounds in the campaign, the slabs allocated in an order depending at least partially on the sort values associated with the slabs.

2. The method of claim 1, wherein the slab values for a slab are associated with at least one of a length of the slab, a width of the slab, a gauge of the slab, a finishing temperature of the slab, a status of the slab, a due date of the slab, and a composition of the slab.

3. The method of claim 1, wherein the sort value comprises a combination of at least two property values, each property value being mapped to and representing one or more slab values for the corresponding property.

4. The method of claim 3, wherein the preference value identifies an order of the property values in the sort value.

5. The method of claim 1, further comprising sequencing the slabs in the rounds.

6. The method of claim 5, wherein sequencing the slabs in the rounds comprises recursively sequencing the slabs in one of the rounds.

7. A method for campaign planning, comprising:
  receiving at least two slab values for each of a plurality of slabs, the slab values for a slab being associated with at least two properties of the slab;
  receiving at least one preference value identifying a relative importance between the properties of the slabs;
  generating a sort value for each of the slabs, the sort value depending at least partially on the slab value associated with the slab and the preference value;
  allocating the slabs to a plurality of rounds in a campaign, each round associated with a maximum total footage of slabs that can be processed during the round, the slabs allocated in an order depending at least partially on the sort values associated with the slabs; and
  sequencing the slabs in the rounds, comprising sequencing the slabs in one of the rounds after the round has been allocated at least a predetermined percentage of its maximum total footage.

8. The method of claim 5, wherein sequencing the slabs in the rounds comprises removing at least one slab from a round, and the method further comprises allocating the removed slab to a different round.

9. A method for campaign planning, comprising:
  receiving at least two slab values for each of a plurality of slabs, the slab values for a slab being associated with at least two properties of the slab;
  receiving at least one preference value identifying a relative importance between the properties of the slabs;
  generating a sort value for each of the slabs, the sort value depending at least partially on the slab value associated with the slab and the preference value;
  allocating the slabs to a plurality of rounds in a campaign, the slabs allocated in an order depending at least partially on the sort values associated with the slabs; and
  sequencing the slabs in the rounds;
  allocating the slabs to the rounds and sequencing the slabs in the rounds comprising:
    allocating at least one slab to a body portion of each round;
    sequencing the slabs in the body portions of the rounds;
    allocating at least one slab to a wideout portion of each round after the slabs are allocated to and sequenced in the body portions of the rounds; and
    sequencing the slabs in the wideout portions of the rounds.

10. The method of claim 5, further comprising sequencing the rounds in the campaign.

11. The method of claim 10, wherein sequencing the rounds in the campaign occurs after the slabs are sequenced in the rounds.

12. The method of claim 1, further comprising determining a candidacy of a slab to be allocated to a round based on at least some of the slab values and at least one candidacy rule.

13. Software for campaign planning, the software embodied in at least one computer-readable medium and when executed operable to:
  receive at least two slab values for each of a plurality of slabs, each slab having at least two properties, each property of a slab having a corresponding slab value;
  receive a preference value for each of one or more preferenced properties of the slabs, the preference value for a preferenced property of the slabs identifying a relative importance of the preferenced property of the slabs compared to one or more other properties of the slabs in determining an order in which the slabs are to be allocated to a plurality of rounds in a campaign;
  generate a sort value for each slab, the sort value for a slab depending at least partially on the slab values associated with the properties of the slab and the preference values for the one or more preferenced properties of the slab; and
  allocate the slabs to the plurality of rounds in the campaign, the slabs allocated in an order depending at least partially on the sort values associated with the slabs.

14. The software of claim 13, wherein the slab values for a slab are associated with at least one of a length of the slab, a width of the slab, a gauge of the slab, a finishing temperature of the slab, a status of the slab, a due date of the slab, and a composition of the slab.

15. The software of claim 13, wherein the sort value comprises a combination of at least two property values, each property value being mapped to and representing one or more slab values for the corresponding property.

16. The software of claim 15, wherein the preference value identifies an order of the property values in the sort value.

17. The software of claim 13, further operable to sequence the slabs in the rounds.

18. The software of claim 17, operable to sequence the slabs in the rounds by recursively sequencing the slabs in one of the rounds.

19. Software for campaign planning, the software embodied in at least one computer-readable medium and when executed operable to:
  receive at least two slab values for each of a plurality of slabs, the slab values for a slab being associated with at least two properties of the slab;
  receive at least one preference value identifying a relative importance between the properties of the slabs;
  generate a sort value for each of the slabs, the sort value depending at least partially on the slab value associated with the slab and the preference value;
  allocate the slabs to a plurality of rounds in a campaign, each round associated with a maximum total footage of slabs that can be processed during the round, the slabs allocated in an order depending at least partially on the sort values associated with the slabs; and
  sequence the slabs in the rounds by sequencing the slabs in one of the rounds after the round has been allocated at least a predetermined percentage of its maximum total footage.

20. The software of claim 17, operable to:
  remove at least one slab from a round; and
  allocate the removed slab to a different round.

21. Software for campaign planning, the software embodied in at least one computer-readable medium and when executed operable to:
  receive at least two slab values for each of a plurality of slabs, the slab values for a slab being associated with at least two properties of the slab;
  receive at least one preference value identifying a relative importance between the properties of the slabs;
  generate a sort value for each of the slabs, the sort value depending at least partially on the slab value associated with the slab and the preference value;
  allocate the slabs to a plurality of rounds in a campaign, the slabs allocated in an order depending at least partially on the sort values associated with the slabs; and sequence the slabs in the rounds;
the software operable to allocate the slabs to the rounds and sequence the slabs in the rounds by:
allocating at least one slab to a body portion of each round;
sequencing the slabs in the body portions of the rounds;
allocating at least one slab to a wideout portion of each round after the slabs are allocated to and sequenced in the body portions of the rounds; and
sequencing the slabs in the wideout portions of the rounds.

22. The software of claim 17, further operable to sequence the rounds in the campaign.

23. The software of claim 22, operable to sequence the rounds in the campaign occurs after the slabs are sequenced in the rounds.

24. The software of claim 13, further operable to determine a candidacy of a slab to be allocated to a round based on at least some of the slab values and at least one candidacy rule.

25. A system for campaign planning, comprising
a memory operable to store:
at least two slab values for each of a plurality of slabs, each slab having at least two properties, each property of a slab having a corresponding slab value; and
a preference value for each of one or more preferenced properties of the slabs, the preference value for a preferenced property of the slabs identifying a relative importance of the preferenced property of the slabs compared to one or more other properties of the slabs in determining an order in which the slabs are to be allocated to a plurality of rounds in a campaign; and
one or more processors collectively operable to:
generate a sort value for each slab, the sort value for a slab depending at least partially on the slab values associated with the properties of the slab and the preference values for the one or more preferenced properties of the slab; and
allocate the slabs to the plurality of rounds in the campaign, the slabs allocated in an order depending at least partially on the sort values associated with the slabs.

26. The system of claim 25, wherein the slab values for a slab are associated with at least one of a length of the slab, a width of the slab, a gauge of the slab, a finishing temperature of the slab, a status of the slab, a due date of the slab, and a composition of the slab.

27. The system of claim 25, wherein the sort value comprises a combination of at least two property values, each property value being mapped to and representing one or more slab values for the corresponding property.

28. The system of claim 27, wherein the preference value identifies an order of the property values in the sort value.

29. The system of claim 25, wherein the one or more processors are further operable to sequence the slabs in the rounds.

30. The system of claim 29, wherein the one or more processors are operable to sequence the slabs in the rounds by recursively sequencing the slabs in one of the rounds.

31. A system for campaign planning, comprising
a memory operable to store:
at least two slab values for each of a plurality of slabs, the slab values for a slab being associated with at least two properties of the slab; and
at least one preference value identifying a relative importance between the properties of the slabs; and
one or more processors collectively operable to:
generate a sort value for each of the slabs, the sort value depending at least partially on the slab value associated with the slab and the preference value;
allocate the slabs to a plurality of rounds in a campaign, each round associated with a maximum total footage of slabs that can be processed during the round, the slabs allocated in an order depending at least partially on the sort values associated with the slabs, and
sequence the slabs in the rounds by sequencing the slabs in one of the rounds after the round has been allocated at least a predetermined percentage of its maximum total footage.

32. The system of claim 29, wherein the one or more processors are operable to:
remove at least one slab from a round; and
allocate the removed slab to a different round.

33. A system for campaign planning, comprising
a memory operable to store:
at least two slab values for each of a plurality of slabs, the slab values for a slab being associated with at least two properties of the slab; and
at least one preference value identifying a relative importance between the properties of the slabs; and
one or more processors collectively operable to:
generate a sort value for each of the slabs, the sort value depending at least partially on the slab value associated with the slab and the preference value;
allocate the slabs to a plurality of rounds in a campaign, the slabs allocated in an order depending at least partially on the sort values associated with the slabs; and
sequence the slabs in the rounds;
the one or more processors operable to allocate the slabs to the rounds and sequence the slabs in the rounds by:
allocating at least one slab to a body portion of each round;
sequencing the slabs in the body portions of the rounds;
allocating at least one slab to a wideout portion of each round after the slabs are allocated to and sequenced in the body portions of the rounds; and
sequencing the slabs in the wideout portions of the rounds.

34. The system of claim 29, wherein the processor is further operable to sequence the rounds in the campaign.

35. The system of claim 34, wherein the processor is operable to sequence the rounds in the campaign after the slabs are sequenced in the rounds.

36. The system of claim 25, wherein the processor is further operable to determine a candidacy of a slab to be allocated to a round based on at least some of the slab values and at least one candidacy rule.

37. A method for campaign planning, comprising:
receiving at least two slab values for each of a plurality of slabs, the slab values for a slab being associated with at least two properties of the slab, the properties of a slab comprising at least one of a length of the slab, a width of the slab, a gauge of the slab, a finishing temperature of the slab, a status of the slab, a due date of the slab, and a composition of the slab;
determining a candidacy value of a slab to be allocated to a round based on at least some of the slab values and at least one candidacy rule;
mapping each of the slab values and the candidacy value to a corresponding property value;
receiving at least one preference value identifying an order of the property values;

determining a region candidacy value for each of the slabs, the region candidacy value identifying whether a slab is a body slab or a wideout slab;

generating a sort value for each of the body slabs, the sort value comprising the property values associated with a slab and arranged according to the preference value;

allocating the body slabs to a plurality of rounds in a campaign, the body slabs allocated in an order depending at least partially on the sort values associated with the slabs;

sequencing the body slabs in the rounds, the body slabs sequenced after at least one round has been allocated at least a maximum total footage of slabs that can be processed during the round;

allocating the wideout slabs to the rounds;

sequencing the wideout slabs in the rounds; and sequencing the rounds in the campaign.

38. Software for campaign planning, the software embodied in at least one computer-readable medium and when executed operable to:

receive at least two slab values for each of a plurality of slabs, the slab values for a slab being associated with at least two properties of the slab, the properties of a slab comprising at least one of a length of the slab, a width of the slab, a gauge of the slab, a finishing temperature of the slab, a status of the slab, a due date of the slab, and a composition of the slab;

determine a candidacy value of a slab to be allocated to a round based on at least some of the slab values and at least one candidacy rule;

map each of the slab values and the candidacy value to a corresponding property value;

receive at least one preference value identifying an order of the property values;

determine a region candidacy value for each of the slabs, the region candidacy value identifying whether a slab is a body slab or a wideout slab;

generate a sort value for each of the body slabs, the sort value comprising the property values associated with a slab and arranged according to the preference value;

allocate the body slabs to a plurality of rounds in a campaign, the body slabs allocated in an order depending at least partially on the sort values associated with the slabs;

sequence the body slabs in the rounds, the body slabs sequenced after at least one round has been allocated at least a maximum total footage of slabs that can be processed during the round;

allocate the wideout slabs to the rounds;

sequence the wideout slabs in the rounds; and sequence the rounds in the campaign.

39. A system for campaign planning, comprising:

a memory operable to store:
at least two slab values for each of a plurality of slabs, the slab values for a slab being associated with at least two properties of the slab, the properties of a slab comprising at least one of a length of the slab, a width of the slab, a gauge of the slab, a finishing temperature of the slab, a status of the slab, a due date of the slab, and a composition of the slab;
at least one property value corresponding to each of the slab values; and
at least one preference value identifying an order of the property values; and one or more processors collectively operable to:
determine a candidacy value of a slab to be allocated to a round based on at least some of the slab values and at least one candidacy rule;
map each of the slab values and the candidacy value to a corresponding property value;
determine a region candidacy value for each of the slabs, the region candidacy value identifying whether a slab is a body slab or a wideout slab;
generate a sort value for each of the body slabs, the sort value comprising the property values associated with a slab and arranged according to the preference value;
allocate the body slabs to a plurality of rounds in a campaign, the body slabs allocated in an order depending at least partially on the sort values associated with the slabs;
sequence the body slabs in the rounds, the body slabs sequenced after at least one round has been allocated at least a maximum total footage of slabs that can be processed during the round;
allocate the wideout slabs to the rounds;
sequence the wideout slabs in the rounds; and
sequence the rounds in the campaign.

40. The method of claim 1, wherein the preference values comprise customer-specified preference values allowing allocation of slabs to rounds in a campaign to be customized for each particular customer.

41. The method of claim 1, further comprising ranking the slabs according to their sort values, the slabs being ranked and allocated in order of increasing sort value.

42. The method of claim 3, wherein the sort value comprises a concatenation of the at least two property values, a position of each property value within the sort value identifying the relative importance of the property value in determining the order in which the slabs are to be allocated.

43. The software of claim 13, wherein the preference values comprise customer-specified preference values allowing allocation of slabs to rounds in a campaign to be customized for each particular customer.

44. The software of claim 13, further operable to rank the slabs according to their sort values, the slabs being ranked and allocated in order of increasing sort value.

45. The software of claim 15, wherein the sort value comprises a concatenation of the at least two property values, a position of each property value within the sort value identifying the relative importance of the property value in determining the order in which the slabs are to be allocated.

46. The system of claim 25, wherein the preference values comprise customer-specified preference values allowing allocation of slabs to rounds in a campaign to be customized for each particular customer.

47. The system of claim 25, wherein the one or more processors are further operable to rank the slabs according to their sort values, the slabs being ranked and allocated in order of increasing sort value.

48. The system of claim 27, wherein the sort value comprises a concatenation of the at least two property values, a position of each property value within the sort value identifying the relative importance of the property value in determining the order in which the slabs are to be allocated.

* * * * *